June 4, 1957  M. L. LIBMAN  2,794,220
THRESHOLD WITH READILY REMOVABLE SEALING MEANS
Filed March 2, 1956
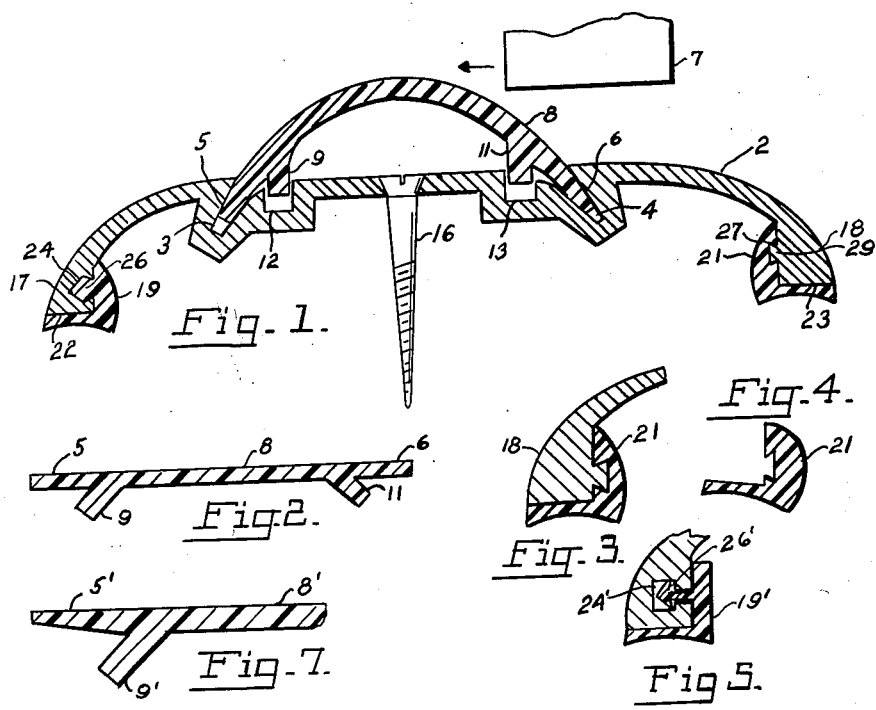
INVENTOR
MAX. L. LIBMAN

2,794,220

THRESHOLD WITH READILY REMOVABLE SEALING MEANS

Max L. Libman, Fairfax County, Va., assignor to Kessler Products Co., Inc., Youngstown, Ohio, a corporation of Ohio Application March 2, 1956, Serial No. 569,103

10 Claims. (Cl. 20—64)

This invention relates to thresholds, and more particularly to a unitary metal threshold provided with flexible sealing means for impeding the passage of air and moisture.

One-piece metal thresholds are becoming increasingly popular in modern construction, particularly in public buildings, and it is highly desirable to provide such thresholds with flexible sealing means for impeding the passage of air between the threshold and the bottom of a door, not only for exterior doors, where entrance of rain is a problem, but also for interior doors, both to exclude noise and to minimize the loss of air from air-conditioned rooms. A threshold of this type is shown in the U. S. patent to Cornell, No. 2,718,677.

It is a primary object of the present invention to provide, in a threshold of the above type, an improved construction whereby the flexible sealing strips may be readily installed and removed for replacement when necessitated by wear and tear.

A further object is to provide a metal threshold having a flexible sealing strip for engaging the bottom of a door, in which the sealing strip is readily installed and replaced without the use of force or tools, and yet once installed, will remain firmly in place under all conditions of ordinary use, without being dislodged by the dragging or rolling of objects over it, due to a novel dynamic locking action.

The specific nature of my invention as well as other objects and advantages thereof will clearly appear from a description of a preferred embodiment as shown in the accompanying drawing, in which:

Fig. 1 is a transverse sectional view of a threshold embodying the invention;

Fig. 2 is a transverse sectional view of the flexible door sealing strip in its normal unflexed condition prior to installation;

Fig. 3 is an enlarged sectional view of the foot portion of the threshold, showing the bottom sealing means;

Fig. 4 is a view of the bottom sealing strip prior to installation, showing its unstressed shape;

Fig. 5 is a sectional view of a modified form of the bottom sealing strip;

Fig. 6 is a view similar to Fig. 1, showing the action of the sealing strip when deformed; and Fig. 7 is a view similar to Fig. 2, but with the strip edge tapered to conform to the groove.

Referring to Fig. 1, the metal threshold member 2 may be made of any suitable metal such as aluminum or brass, preferably drawn or extruded as a single long piece, which is cut off into suitable lengths. Wedge-shaped grooves 3, 4 run continuously along the length of the threshold for receiving the edges 5, 6 of a flexible sealing member 8, preferably made of extruded plastic material, such as vinyl plastic, which has great strength and resistance to abrasion. The strip 8 in its unflexed form is shown in Fig. 2, and is provided with legs or beads 9, 11 which, when the strip is inserted in the threshold as shown in Fig. 1, fit loosely into corresponding grooves 12, 13.

It will be noted that the legs 9, 11 do not seat completely in their grooves 12, 13. However, if an object is scuffed across the top of the sealing strip, as might happen with a close fitting door bottom, or by a shoe 14, due to the arched shape of the sealing strip, there will necessarily be a downward component of force due to any object moving horizontally across the top of the sealing strip, and therefore the first thing that will happen is that leg 9 seats securely into its groove 12 as shown in Fig. 6 and firmly locks the sealing strip against any tendency to be torn out of position.

It will be noted that the grooves 3, 4 are wedged shaped, and are slightly wider at the top of the groove than the thickness of the edge of 5 or 6 of sealing strip 8, but narrower than this thickness near the bottom of the groove, so that while the sealing strip is readily received, it is firmly wedged into the groove by any downward pressure or downward component of pressure upon the sealing strip. It is thus rendered almost impossible to dislodge the sealing strip by any condition in ordinary use.

It will be noted that the metal threshold 2 is secured in place by screws 16 passing through holes provided at suitable intervals along the length of the threshold, and that these screws are concealed by the flexible sealing strip 8 after it is installed. After the threshold is thus fastened down into place, the sealing strip 8 can readily be inserted without the use of any tools, since there is no force opposing the insertion of the edges of the sealing strip into the grooves 3, 4 and 12, 13. If for any reason it becomes necessary to replace the sealing strip 8, it can readily be lifted up, since it opposes very little resistance to an upward pull, by pinching the exposed top of the sealing strip either in the fingers or with a pair of pliers and pulling directly up from the threshold. This releases the edges 5, 6 from the wedging action of their grooves, and thus requires very little force.

While the edges 5, 6 of the flexible sealing strip 8 may be of the same thickness as the body of the sealing strip, they may also be tapered as shown in Fig. 7 so as to mate more snugly with the wedge-shaped grooves 3, 4. In addition, the surface of either the edges 5, 6 or the interior surfaces of grooves 3, 4 or both may be roughened to provide better frictional engagement and retention of the sealing strips in the wedged-shaped grooves.

For exterior use particularly, it may be desirable to provide additional sealing strips on the bottoms of legs 17, 18 of the threshold. For this purpose, sealing strips 19, 21 are provided which rest unimpeded along the entire bottom edges 22, 23 respectively of the legs 17, 18. Suitable interlocking engagement means may be provided for retaining the sealing strips in place, of which two forms are shown in Fig. 1. In connection with strip 19, an undercut groove 24 is provided which engages a corresponding portion 26 of strip 19, so that the two are assembled merely by pressing the strip into place. In the case of strip 21, the recess 27 is provided in the strip for mating with a corresponding projection 29 extending from the interior side of leg 18. Fig. 3 is an enlarged view of leg 18 and strip 21, while Fig. 4 shows the unstressed shape of the strip cross-section prior to assembly. It will be noted that the shape is such that the strip hugs the bottom surface of leg 18.

Fig. 5 shows another form of strip 19', corresponding functionally to strip 19, but provided with a barb 26' which engages the undercut shoulders of groove 24' in the manner which will be self-evident. Alternatively, the sealing strips for the legs may be fastened to the bottoms of the respective legs with adhesive or in any other suitable manner.

Another advantage of the tapered construction of Fig. 7 is that due to the snug fit it makes with groove 3, there is no opportunity for dirt to enter into the groove so as to render it difficult or impossible to subsequently remove the flexible strip.

It will be apparent that the embodiments shown are only exemplary and that various modifications can be made in construction and arrangement within the scope of my invention as defined in the appended claims.

I claim:

1. A threshold comprising an elongated metal strip, longitudinally extending, oppositely inclined grooves in the top surface of said strip, said grooves being respectively tapered from a larger mouth width to a smaller bottom width, an elongated flexible sealing strip having its opposite edges respectively engaged in said grooves, and its center portion arched away from the top of said metal strip, and an additional longitudinal groove perpendicular to the upper surface of said strip and spaced between said first grooves and adjacent one of them, and a longitudinal rib extending downwardly from adjacent an edge of said flexible strip into loose engagement with the top portion of said groove.

2. A sealing threshold comprising an elongated rigid threshold body having outer edge portions and an intermediate door-underlying portion, a flexible resilient elongated sealing strip extending upward from the intermediate portion of said body to form a seal with the bottom of a door, said strip having two lateral edges, two longitudinal grooves in the upper surface of said body each inclined away from said intermediate portion and respectively on opposite sides thereof, one lateral edge of said strip being retained in each of said grooves respectively, and at least one second longitudinal groove in said upper surface adjacent one of said first grooves and spaced inwardly from said one groove toward said intermediate portion, a longitudinal bead extending downwardly from said strip into engagement with said second groove, said strip extending from said one lateral edge in resilient arched relation to the upper surface of said body.

3. The invention according to claim 2, said bead fitting loosely into said second groove.

4. The invention according to claim 3, said bead, in the normal arch-shaped condition of said strip, extending only part way into said second groove, whereby on downward flexing of said arch-shaped strip, the bead is moved toward full seating position in said second groove.

5. The invention according to claim 4, said first grooves being smaller in width toward the bottom than at the top to form a wedge-shaped cross-section.

6. The invention according to claim 5, said lateral edges of the strip being wedge-shaped in cross-section to conform to the shape of said first grooves.

7. A sealing threshold comprising an elongated rigid threshold body having outer edge portions and an intermediate door-underlying portion, a flexible resilient elongated sealing strip extending upward from the intermediate portion of said body to form a seal with the bottom of a door, said strip having two lateral edges, a longitudinal groove in the upper surface of said body inclined toward said intermediate portion, one lateral edge of said strip being retained in said groove, and a second longitudinal groove in said upper surface spaced inwardly from said first groove toward said intermediate portion, a longitudinal bead extending downwardly from said strip into engagement with said second groove, said strip extending from said one lateral edge in resilient arched relation to the upper surface of said body, said strip being laterally symmetrical to provide a second edge and a second bead, and said body having two additional grooves symmetrically disposed with respect to the first-mentioned two grooves for removably receiving said second edge and second bead.

8. The invention according to claim 7, and fastening means located beneath said arch-shaped strip for fastening said threshold to a floor surface.

9. The invention according to claim 2, at least one outer edge portion of said body comprising a downwardly extending leg portion having a substantial bottom surface and a concealed inner wall surface, a longitudinal sealing strip resting on said bottom surface and having an upwardly extending concealed arm portion, and means for removably fastening said arm portion to said concealed inner wall surface.

10. The invention according to claim 9, said fastening means comprising releasable interlock means between said arm portions and said leg.

References Cited in the file of this patent
UNITED STATES PATENTS 2,718,677     Cornell _____ Sept. 27, 1955